(12) United States Patent
Yamagishi et al.

(10) Patent No.: US 8,491,125 B2
(45) Date of Patent: Jul. 23, 2013

(54) LIGHTING DEVICE AND PROJECTION TYPE DISPLAY APPARATUS INCLUDING THE SAME

(75) Inventors: Shigekazu Yamagishi, Osaka (JP); Hiroki Sugiyama, Osaka (JP); Hiroshi Kitano, Hyogo (JP); Yoshimasa Fushimi, Osaka (JP); Hirokazu Sakaguchi, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 280 days.

(21) Appl. No.: 13/037,385

(22) Filed: Mar. 1, 2011

(65) Prior Publication Data
US 2011/0261271 A1 Oct. 27, 2011

(30) Foreign Application Priority Data
Apr. 27, 2010 (JP) .................. 2010-101722

(51) Int. Cl.
*G03B 21/28* (2006.01)
*H04N 9/31* (2006.01)
*F21V 5/00* (2006.01)
*F21V 5/02* (2006.01)
*G02B 27/14* (2006.01)
*G02B 27/12* (2006.01)
*G02B 6/34* (2006.01)
*G02B 6/32* (2006.01)
*G02B 6/00* (2006.01)

(52) U.S. Cl.
USPC .................. 353/33; 353/94; 353/81; 353/31; 348/744; 348/337; 362/337; 362/339; 359/638; 359/640; 385/36; 385/34; 385/133

(58) Field of Classification Search
USPC ... 353/31, 94, 81, 33; 348/744, 337; 362/337, 362/339; 359/618, 638, 640; 385/36, 34, 385/133
See application file for complete search history.

(56) References Cited

U.S. PATENT DOCUMENTS

| | | | | |
|---|---|---|---|---|
| 6,341,876 B1* | 1/2002 | Moss et al. | | 362/268 |
| 7,338,187 B2* | 3/2008 | Li | | 362/297 |
| 7,505,205 B2* | 3/2009 | Sacre et al. | | 359/618 |
| 2006/0001973 A1* | 1/2006 | Peterson et al. | | 359/618 |
| 2009/0251789 A1* | 10/2009 | Huibers et al. | | 359/634 |

FOREIGN PATENT DOCUMENTS

| | | |
|---|---|---|
| JP | 2001-512584 A2 | 8/2001 |
| JP | 2008-191653 A1 | 8/2008 |

* cited by examiner

*Primary Examiner* — Georgia Y Epps
*Assistant Examiner* — Magda Cruz
(74) *Attorney, Agent, or Firm* — Judge Patent Associates

(57) ABSTRACT

A lighting device configured to efficiently combine light beams emitted from a plurality of light sources, and to emit high output light while minimizing light loss, and a projection type display apparatus including the lighting device. The lighting device includes: a first light source and a second light source; two converging lenses for converging light beams emitted from the first and second light sources; two right-angle prisms for bending the light beams emitted from the first and second light sources; and a composite rod integrator for combining the light beams emitted from the first and second light sources. Between an exit surface of each right-angle prism and an incident surface of the composite rod integrator, a predetermined air gap is provided. The focal point of each converging lens is located on an incident surface of each right-angle prism.

9 Claims, 6 Drawing Sheets

LIGHTING DEVICE AND PROJECTION TYPE DISPLAY APPARATUS INCLUDING THE SAME

CROSS REFERENCE TO RELATED APPLICATION

The disclosure of Japanese Patent Application No. 2010-101722, filed on Apr. 27, 2010, is incorporated herein by reference.

BACKGROUND OF THE INVENTION

1. Field of the Invention

The present invention relates to lighting devices using rod integrators which combine multiple light beams, and in particular to projection type high-brightness display apparatuses which use image display elements.

2. Description of the Background Art

As a method to display a large-screen view, projection type display apparatuses are known which illuminate image display elements with light in accordance with video signals to form optical images, and which project and enlarge the optical images through projection lenses. The image display elements are typified by liquid crystal panels and digital mirror devices (DMDs). In such projection type display apparatuses, improvement in brightness of the projected images is strongly demanded.

To improve the brightness of projected images from a projection type display apparatus, power consumption of lamp used as the light source can be increased. However, if the power consumption is increased while a sufficiently long lifespan of the lamp is ensured, light-emitting elements thereinside have to be elongated and thickened. As a result, light use efficiency of the optical system will deteriorate. In the case of using LEDs instead of lamps, even if the power consumption of the projector is to be increased to a predetermined level of power consumption, it is not possible to ensure the long lifespan of the light source (LEDs), since the upper limit of a current value the LEDs can withstand is not high. In addition, in this case, it is difficult to minimize the heat generated from the LEDs within a range the LEDs can withstand. Thus, to solve the above problems, techniques are being developed which use a plurality of light sources having relatively small power consumptions, such as LEDs, thereby to efficiently improve the brightness of the projection type display apparatuses.

As shown in FIG. 6, in Japanese National Phase PCT Laid-Open Publication No. 2001-512584 (Patent Literature 1), light beams outputted from two light sources 401 and 402 are combined using a rod integrator, and thereby high brightness is realized. Prisms 405 and 406 are arranged so that they are in contact with an incident surface 404 of a composite rod 403. Between the prism 405 and the light source 401, a converging lens 407 is arranged so that parallel light beam emitted from the light source 401 are focused on the incident surface 404 of the composite rod 403. Similarly, between the prism 406 and the light source 402, a converging lens 408 is arranged so that parallel light beam emitted from the light source 402 are focused on the incident surface 404 of the composite rod 403. The light beam emitted from the light source 401 enters the prism 405 through the converging lens 407, is reflected by an inclined surface 409, and form a spot on the incident surface 404 of the composite rod 403. Similarly, the light beam emitted from the light source 402 enters the prism 406 through the converging lens 408, is reflected by an inclined surface 410, and forms a spot on the incident surface 404 of the composite rod 403. The light beams emitted from the light sources 401 and 402 are repeatedly reflected inside the composite rod 403, and thereby combined together. Accordingly, light having uniform luminance distribution is outputted from an exit surface 411 of the composite rod 403.

As shown in FIG. 7, in Japanese Laid-Open Patent Publication No. 2008-191653 (Patent Literature 2), light beams emitted from two light sources 501 and 502 enter a triangular prism 503 perpendicularly to a first surface 504 and a second surface 505. The light beam emitted from the light source 501 passes through the first surface 504, is totally reflected by the second surface 505, and enters the composite rod 506. On the other hand, the light beam emitted from the light source 502 passes through the second surface 505, is totally reflected by the first surface 504, and enters the composite rod 506. The apical angle of the triangular prism 503 is preferably 60 degrees so that the totally reflected light beams travel in parallel to each other.

SUMMARY OF THE INVENTION

In actuality, the light beams emitted from light sources have predetermined converging angles, and thus have the following problem. In Patent Literature 1, the light beams having entered the prisms 405 and 406 are focused on the incident surface 404 of the composite rod 403. Thus, if a light source image formed on the incident surface 404 is sufficiently small relative to the incident surface 404, the light beam can be effectively used. On the other hand, if the light source image is large, that is, if a discharge lamp having a long arc length or a high output LED is used as the light source, the image overflows at the periphery of the entrance (i.e., incident surface), and thus the light beam cannot be used effectively. Similarly in Patent Literature 2, in the case of a light source which forms a sufficiently small light source image relative to the incident surface, no problem will be caused. However, in the case of a light source forming a large light source image, or in the case where a light beam enters the composite rod while having a large converging angle, the light beam forming the light source image partially travels around the periphery of the incident surface cannot be used. Consequently, a problem is caused that light beams emitted from light sources cannot be used efficiently as lighting.

Therefore, an object of the present invention is to provide a lighting device which is configured to efficiently combine light beams emitted from a plurality of light sources, and to output high output light while minimizing light loss, and also to provide a projection type display apparatus including the lighting device.

To solve the above problems, an aspect of the present invention is a lighting device comprising: a plurality of light sources; a plurality of converging lenses for converging respective light beams emitted from the light sources; a right-angle prism for bending the light beam emitted from one of the light sources; and a composite rod integrator for combining the light beams emitted from the plurality of light sources. A predetermined air gap is provided between an exit surface of the right-angle prism and an incident surface of the composite rod integrator. In addition, the focal point of one of the plurality of converging lenses is located on an incident surface of the right-angle prism.

Further, in the lighting device, the light beams emitted from the one of light sources may enter through the incident surface of the right-angle prism perpendicularly.

Further, in the lighting device, the right-angle prism may be formed of highly refractive material having a refractive index of 1.5 or more.

Further, in the lighting device, two surfaces of the right-angle prism, except the incident surface, the exit surface, and an inclined surface, may be parallel to each other.

Further, the lighting device may be configured to satisfy the following condition, $$|n1\sin(\pi/2-2\theta i+\sin^{-1}((\sin(\theta c))/n1))|<1$$

where:

θi: angle formed between a central axis of the light beam entering the right-angle prism and a line perpendicular to the inclined surface of the right-angle prism, θc: angle formed between the light beam that is outputted from the converging lens and incident on the incident surface of the right-angle prism at the largest incident angle, and the optical axis of the converging lens, and n1: refractive index of material forming the right-angle prism.

The angle θc ranges from −θc to +θc, where the angle measured clockwise from the optical axis 109 is denoted by "+", whereas the angle measured anticlockwise from the optical axis 109 is denoted by "−".

Further, in the lighting device, an angle formed between the incident surface and the inclined surface of the right-angle prism may be 45 degrees.

Further, in the lighting device, a plurality of the right-angle prisms may be arranged with respect to the composite rod integrator, and the sum of the area of exit surfaces of the plurality of right-angle prisms may be equal to the area of the incident surface of the composite rod integrator.

Further, in the lighting device, the light beam entering the right-angle prisms does not contain ultraviolet light and infrared light.

Further, in the lighting device, each of the plurality of light sources may be constituted of a solid-state light source.

A further aspect of the present invention to solve the above problems is a projection type display apparatus, comprising: the above-described lighting device; an image display element, on which a light beam outputted from the lighting device is incident, for modulating the incident light beam in accordance with video signals; and a projection lens for projecting the light beam modulated by the image display element onto a screen.

According to the present invention, light beams emitted from the light sources form a light source image on the incident surfaces of the one or more right-angle prisms. The light beams having entered the one or more right-angle prisms travel inside the right-angle prisms while maintaining the respective incident angles, and propagate through to the incident surface of the composite rod integrator. Accordingly, the light beams emitted from the plurality of light sources are efficiently combined. And a lighting device which emits high output light while minimizing light loss, and a projection type display apparatus using the lighting device can be obtained.

DESCRIPTION OF THE PREFERRED EMBODIMENTS (First Embodiment)

Figure 1:
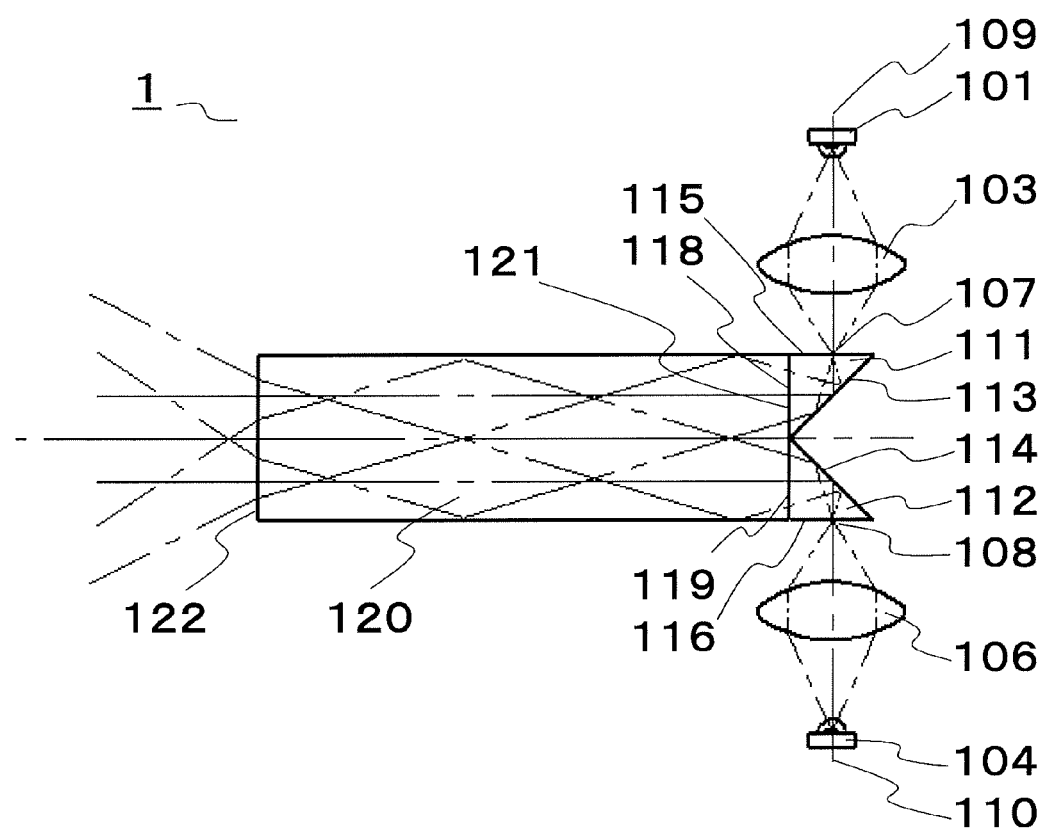
FIG. 1 is a configuration diagram of a lighting device according to a first embodiment.
Figure 2:
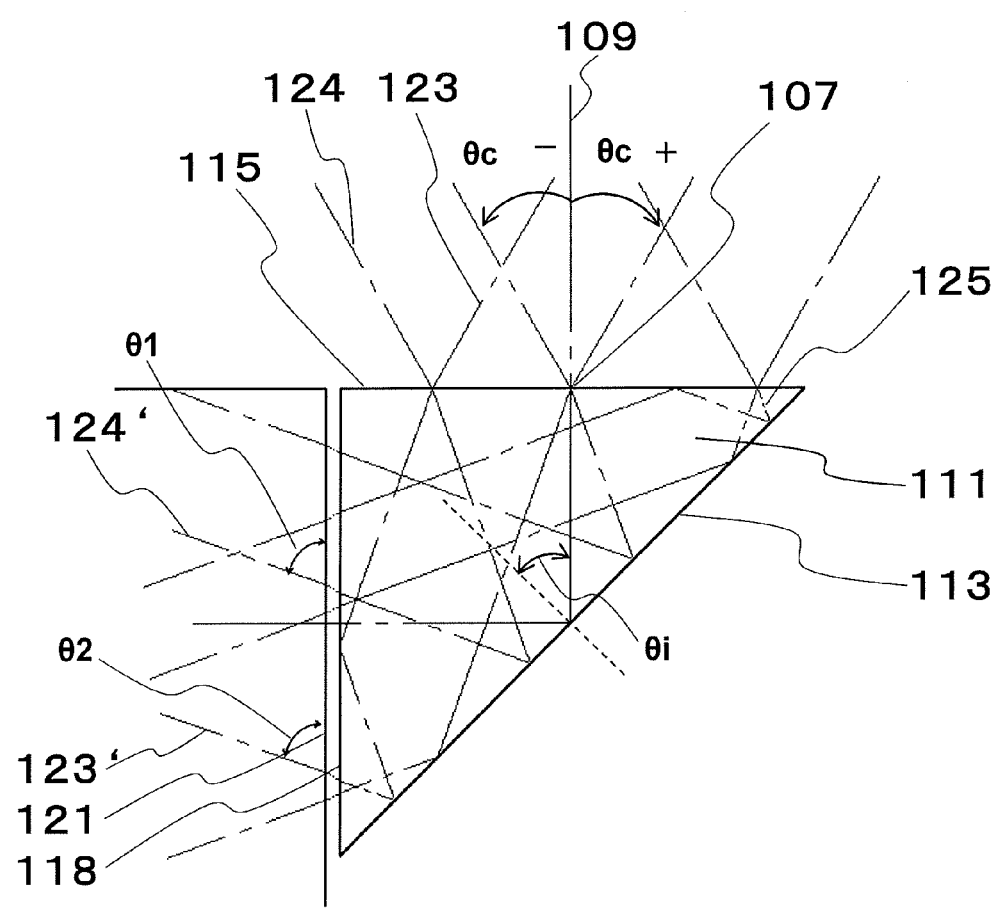
FIG. 2 is an enlarged view of a right-angle prism and its surrounding area in the lighting device illustrated in FIG. 1.

FIG. 1 is a configuration diagram of a lighting device according to a first embodiment of the present invention. FIG. 2 is an enlarged view of a right-angle prism and its surrounding area in the lighting device illustrated in FIG. 1.

A lighting device 1 combines light beams emitted from a plurality of light sources to perform uniform illumination, and includes a first light source 101, a second light source 104, converging lenses 103 and 106, right-angle prisms 111 and 112, and a composite rod integrator 120.

The first light source 101 and the second light source 104 are each composed of an LED mounted on the corresponding circuit board.

The converging lens 103 is arranged forward of the first light source 101, and converges a light beam emitted from the first light source 101. The converging lens 106 is arranged forward of the second light source 104, and converges a light beam emitted from the second light source 104. A focal point 107 of the first converging lens 103 and a focal point 108 of the second converging lens 106 are located on an incident surface 115 of the right-angle prism 111 and on an incident surface 116 of the right-angle prism 112, respectively.

The right-angle prism 111 guides the light beam emitted from the first light source 101 to the composite rod integrator 120. The light beam emitted from the first light source 101 enters through the incident surface 115 of the right-angle prism 111 perpendicularly to the incident surface 115, and are bent by the inclined surface 113. The right-angle prism 112 guides the light beam emitted from the second light source 102 to the composite rod integrator 120. Similarly, the light beam emitted from the second light source 104 enters through the incident surface 116 of the right-angle prism 112 perpendicularly to the incident surface 116, and is bent by the inclined surface 114. In the right-angle prisms 111 and 112, the inclined surfaces 113 and 114 are inclined at exactly 45 degrees relative to the incident surfaces 107 and 108, respectively. In addition, in each of the right-angle prisms 111 and 112, two surfaces except the incident surface, the exit surface and the inclined surface are parallel to each other. The right-angle prisms 111 and 112 are form of optical glass having a high refractive index.

The composite rod integrator 120 combines the light beams outputted from the right-angle prisms 111 and 112. The composite rod integrator 120 is an optical element which has a rectangular columnar shape and is formed of glass. The light beams entering obliquely through the incident surface 121 are totally reflected repeatedly inside the composite rod integrator 120. The light beams having various incident angles are propagated while being totally reflected repeatedly, and thereby combined together. The combined light beams having a uniform intensity distribution are then outputted from the exit surface 122.

As described above, the light beams are totally reflected repeatedly, and thereby are propagated inside the composite rod integrator 120. Thus, the composite rod integrator 120 does not require reflection mirror coating. As a result, it is possible to prevent heat generation in the composite rod integrator, which is caused by absorption of light at the time of reflection, and in addition, the lighting device manufacturing cost can be reduced.

The right-angle prisms 111 and 112 are arranged such that the respective incident surfaces 115 and 116 face opposite directions. Further, as illustrated in FIG. 2, a predetermined air gap is provided between an exit surface 118 of the right-angle prism 111 and the incident surface 121 of the composite rod integrator 120. Although not illustrated, a predetermined air gap is provided also between an exit surface 119 of the right-angle prism 112 and the incident surface 121 of the composite rod integrator 120.

If the exit surface 118 of the right-angle prism 111 is in contact with the incident surface 121 of the composite rod integrator 120, the light beam which is incident on the exit surface 118 while having a large incident angle enters the composite rod integrator 120 with the incident angle hardly changed. After being totally reflected repeatedly, the light beam is outputted from the exit surface 122 while having wide emission angles. Thus, among the light beams traveling from the inclined surface 113 to the exit surface 118, those light beams which have wide incident angles are not effectively used as lighting.

To solve this, in the lighting device 1 according to this embodiment, an air space is provided between the exit surface 118 of the right-angle prism 111 and the incident surface 121 of the composite rod integrator 120. The refractive index of the air space is lower than that of the right-angle prism 111. Accordingly, a light beam entering through exit surface 118 of the right-angle prism 111 while having an angle larger than a critical angle relative to the exit surface 118 is totally reflected by the exit surface 118. The light beam totally reflected by the exit surface 118 is totally reflected by the inclined surface 113 and the incident surface 115, and then enters through the exit surface 118 again. The incident angle, relative to the exit surface 118, of the light beam entering through the exit surface 118 again, is equal to or smaller than the critical angle. Thus, the light beam passes through the exit surface 118. Light beams having passed through the exit surface 118 are outputted from the exit surface 122 of the composite rod integrator 120 while having relatively small emission angles, and thus the light beam can be used effectively as lighting. As above described, with the air gap provided between the right-angle prisms 111 and 112 and the composite rod integrator 120, those light beams which were not effectively used as lighting can be used effectively.

Further, the focal point 107 of the first converging lens 103 and the focal point 108 of the second converging lens 106 are located on the incident surface 115 of the right-angle prism 111 and the incident surface 116 of the right-angle prism 112. Accordingly, even if large light source images are formed on the incident surface 115 of the right-angle prism 111 and the incident surface 116 of the right-angle prism 112, all the light beams forming the light source images can pass through the incident surfaces 115 and 116. This makes it possible to utilize light sources forming large light source images, and also to use the light beams emitted from the first light source 101 and second light source 104 efficiently.

Further, the sum of the area of the exit surface 118 of the right-angle prism 111 and the area of the exit surface 119 of the right-angle prism 112 is set equal to the area of the incident surface 121 of the composite rod integrator 120. Thus, the light beams emitted from the first light source 101 and second light source 104 are guided to the composite rod integrator 120 efficiently.

Here, a preferable condition for totally reflecting light beams emitted from the light sources thereby to guide the light beams efficiently in the composite rod integrator 120 will be described.

In FIG. 2, if a light beam 123, among the light beams incident on the exit surface 118 of the right-angle prism 111, was not totally reflected by the exit surface 118, the light beam 123 would enter through the incident surface 121 of the composite rod integrator 120 while having a very large angle relative to the incident surface 121. The light beam incident on the incident surface 121 while having a large incident angle cannot be used effectively as lighting. Other light beams illustrated in FIG. 2 are totally reflected by the inclined surface 113, pass through the exit surface 118, and enters through the incident surface 121 of the composite rod integrator 120. Accordingly, the light beam 123 needs to be totally reflected by the exit surface 118 and by the inclined surface 113 of the right-angle prism 111 in this order, and then to be outputted from the exit surface 118 without being totally reflected by the exit surface 118. Specifically, the following numerical expression (1) needs to be satisfied.

$$|n1\ \sin(\pi/2-2\theta i+\sin^{-1}((\sin(\theta c))/n1)|<1 \tag{1}$$

where,

θi: angle formed between the central axis of the light beam entering the right-angle prism 111 and a line perpendicular to the inclined surface 113 of the right-angle prism 111, θc: angle formed between the light beam that is outputted from the converging lens and incident on the incident surface of the right-angle prism at the largest incident angle, and the optical axis of the converging lens, and n1: refractive index of the material forming the right-angle prism.

The light beams outputted from the converging lens 103 are rotationally symmetrical about the optical axis 109 of the converging lens 103, and thus the angle θc is directional. Specifically, the angle of the light beam incident on the incident surface 115 ranges −θc to +θc, where the angle measured clockwise from the optical axis 109 is denoted by "+", whereas the angle measured anticlockwise from the optical axis 109 is denoted by "−".

Here, if formula (1) is not satisfied, the light beam 123, for example, does not finally pass through the exit surface 118 of the right-angle prism 111 but is totally reflected in FIG. 2. The light beam 123 then passes through the incident surface 115 of the right-angle prism 111 and returns to the light source, resulting in an ineffective light beam. Alternatively, the light beam 123 is not totally reflected by the inclined surface 113 of the right-angle prism 111 but passes through the inclined surface 113, and then will not enter the composite rod integrator 120, resulting in an ineffective light beam.

Meanwhile, under a condition where a predetermined air gap is provided between the exit surface 118 of the right-angle prism 111 and the incident surface 121 of the composite rod integrator 120, if the light beams entering the right-angle prisms 111 and 112 satisfy the relation indicated by numeral expression (1), all the light beams are outputted from the exit surface 122 of the composite rod integrator 120 while having relatively small emission angles. Thus, the light beams can be used effectively as lighting.

Preferably, the angle θ1 formed between a light beam 124' which is a light beam 124 having a cone angle of −θc and has entered the composite rod integrator 120, and the incident surface 121 is equal to an angle θ2 formed between a light beam 123' which is the light beam 123 having a cone angle of +θc and has entered the composite rod integrator 120, and the incident surface 121.

Here, description will be made of θi, θc, and n1 by using specific values.

In the case of θi=45 degrees, θc=−30 degrees to +30 degrees, and n1=1.8, the value of n1 sin(π/2−2θi+sin$^{-1}$ ((sin (θc))/n1) will range −0.48 to +0.48, and the absolute value is 0.48 or lower, which satisfies numeral expression (1). Thus, under this condition, the light beam outputted from the exit surface 118 of the right-angle prism 111 are used effectively as lighting.

On the other hand, in the case of θi=55 degrees, θc=−30 degrees to +30 degrees, and n1=1.8, the value of n1 sin(π/2−2θi+sin$^{-1}$ ((sin(θc))/n1) ranges −1.04 to −0.14, and the absolute value is 1.04 or lower, which does not satisfy numerical expression (1). Further, in the case of θi=35 degrees, θc=−30 degrees to +30 degrees, and n1=1.8, the value of n1 sin(π/2−2θi+sin$^{-1}$ ((sin(θc))/n1) ranges +0.14 to +1.04, and the absolute value is 1.04 or lower, which does not satisfy formula (1). Thus, under these conditions, the light beam outputted from the exit surface 118 of the right-angle prism 111 is not entirely used effectively as lighting.

Accordingly, in the case of θi=45 degrees, the light beam outputted from the exit surface 118 of the right-angle prism 111 has emission angles symmetrical to the central axis of the light beam. Thus, in this embodiment, θi is set to be 45 degrees. Accordingly, θc and n1 can be set in the widest ranges, respectively. As a result, selections of the rod integrator, the right-angle prisms, and the converging lenses, for example, and the layout of the respective components can be made highly flexibly.

The above-described verification is made based on the light beam that is incident on the incident surface 115 of the right-angle prism, at the position on the incident surface 115 relatively closer to the composite rod integrator 120. On the other hand, a light beam 125 that is incident on the incident surface 115 of the right-angle prism, at the position on the incident surface 115 farthest to the composite rod integrator 120, is reflected by the inclined surface 113, is then totally reflected by the incident surface 115, and thereby enters through the exit surface 118. The light beam 125 can be also effectively utilized as lighting if the light beam 125 similarly satisfies the above verified condition.

The values of θi, θc, and n1 are not limited to those values described above, but may be determined in consideration of the size of the lighting device, interference between the lighting device and other components, costs of the lighting device, whether the component parts can be obtained easily, and the like.

In this embodiment, the light sources are configured with LEDs. However, light sources having other configurations may be adopted such as: a reflector lamp formed of a discharge lamp with an elliptical reflection surface; a lamp formed of a discharge lamp with a parabolic surface, an elliptical surface having a long focal length, or a converging lens; or a lamp formed of a laser (LD) light source with a converging lens. It should be noted that if a high-pressure mercury vapor lamp, which is a discharge lamp is used as a light source, the right-angle prism which is formed of high refractive index material may absorb ultraviolet light or infrared light, and cause heat generation and thermal expansion, and end up with burst. Thus, it is preferable that light beams emitted from light sources are filtered before their entering the right-angle prism to eliminate the ultraviolet light and the infrared light from the light beams emitted from the light sources.

(Second Embodiment)

Figure 3:
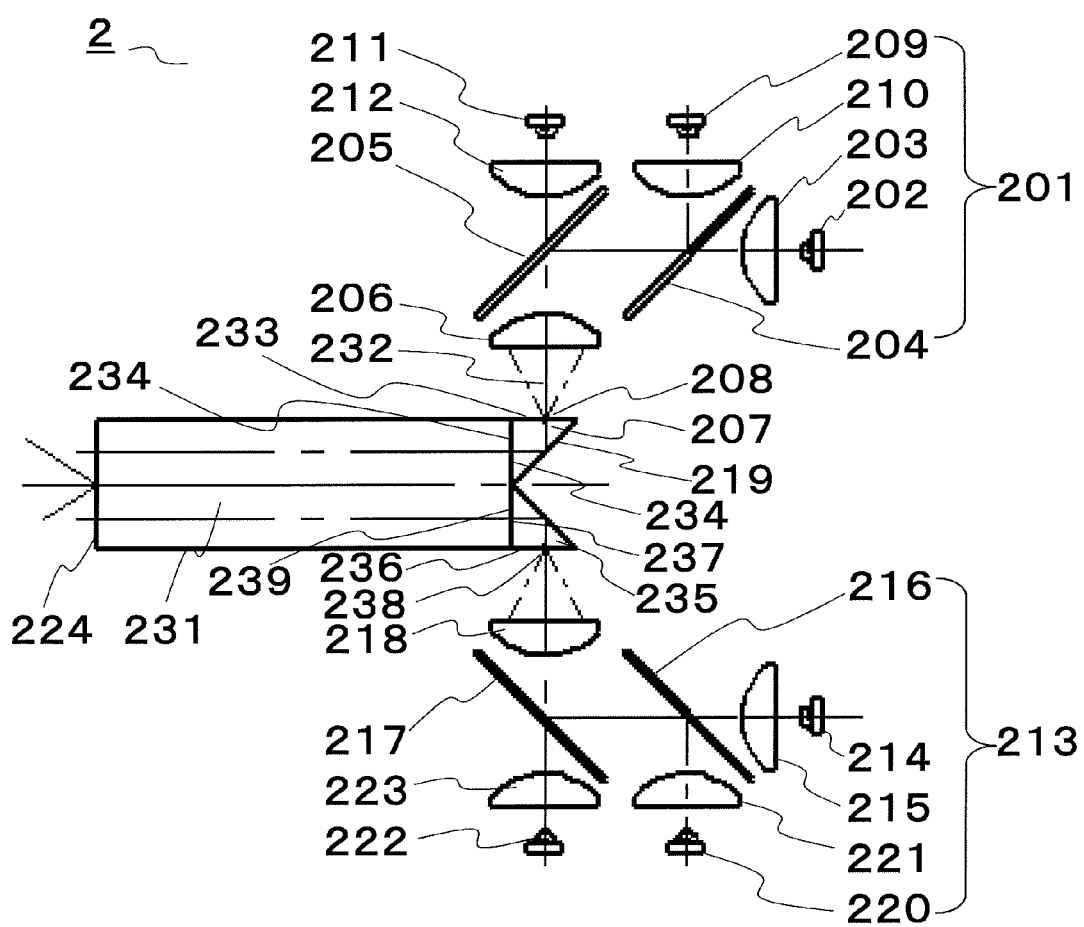
FIG. 3 is a configuration diagram of a lighting device according to a second embodiment.

FIG. 3 is a configuration diagram of a lighting device according to a second embodiment.

The lighting device according to the second embodiment is different from that according to the first embodiment in that the lighting device generates white light from red light, green light, and blue light. Specifically, the lighting device according to the second embodiment has a first light source and a second light source. Those components of the configuration which are the same as those in the first embodiment will not be described.

A first light source 201 includes an LED 211 emitting a red light beam, an LED 202 emitting a green light beam, an LED 209 emitting a blue light beam, collimator lenses 203, 210, and 212 which convert light beams emitted from the LEDs 202, 209 and 211 to parallel light beams, respectively, a blue reflection dichroic mirror 204 which reflects the blue light beam only, and a red transmission dichroic mirror 205 which allows only the red light beam to pass therethrough.

The green light beam emitted from the LED 202 is converted into substantially a parallel light beam by the collimator lens 203 whose focal point is located on a light-emitting surface of the LED 202. The green light beam having been converted into the parallel light beam pass through the blue reflection dichroic mirror 204, and then is reflected by the red transmission dichroic mirror 205. The reflected green light beam is converged on the incident surface 233 of the right-angle prism 207 by the converging lens 206, and then enters the right-angle prism 207. The blue light beam emitted from the LED 209 is converted into substantially a parallel light beam by the collimator lens 210 whose focal point is located on a light-emitting surface of the LED 209. The blue light beam having been converted into the parallel light beam is reflected by the blue reflection dichroic mirror 204, and then reflected by the red transmission dichroic mirror 205. Similarly to the green light beam, the reflected blue light beam is converged on the incident surface 233 of the right-angle prism 207 by the converging lens 206, and then enters the right-angle prism 207. The red light beam emitted from the LED 211 is converted into substantially a parallel light beam by the collimator lens 212 whose focal point is located on a light-emitting surface of the LED 211. The red light beam having been converted into the parallel light beam passes through the red transmission dichroic mirror 205, is converged on the incident surface 233 of the right-angle prism 207 by the converging lens 206, and then enters the right-angle prism 207.

The second light source 213 includes an LED 222 emitting a red light beam, an LED 214 emitting a green light beam, an LED 220 emitting a blue light beam, collimator lenses 215, 221, and 223 which convert the light beams emitted from the LEDs 214, 220, and 222 into parallel light beams, respectively, a blue reflection dichroic mirror 216 which reflects the blue light beam only, and a red transmission dichroic mirror 217 which allows the red light beam only to pass therethrough.

The green light beam emitted from the LED 214 is converted into substantially a parallel light beam by the collimator lens 215 whose focal point is located on a light-emitting surface of the LED 214. The green light beam having been converted into the parallel light beam passes through the blue reflection dichroic mirror 216, and then is reflected by the red transmission dichroic mirror 217. The reflected green light beam is converged on the incident surface 236 of the right-angle prism 235 by the converging lens 218, and then enters the right-angle prism 235. The blue light beam emitted from the LED 220 is converted into substantially a parallel light beam by the collimator lens 221 whose focal point is located on a light-emitting surface of the LED 220. The blue light beam having been converted into the parallel light beam is reflected by the blue reflection dichroic mirror 216, and then reflected by the red transmission dichroic mirror 217. Similarly to the green light beam, the reflected blue light beam is converged on the incident surface 236 of the right-angle prism 235 by the converging lens 218, and then enters the right-angle prism 235. The red light beam emitted from the LED 222 is converted into substantially a parallel light beam by the collimator lens 223 whose focal point is located on a light-emitting surface of the LED 222. The red light beam having been converted into the parallel light beam passes through the red transmission dichroic mirror 217, is converged on the incident surface 236 of the right-angle prism 235 by the converging lens 218, and then enters the right-angle prism 235.

In a lighting device 2 as well, a predetermined air gap is provided between exit surfaces 234 and 237 of the right-angle prisms 207 and 235, and an incident surface 239 of the composite rod integrator 231. The light converging point 208 of the first converging lens 206, and the light converging point 238 of the second converging lens 218 are located on the incident surface 233 of the right-angle prism 207 and on the incident surface 236 of the right-angle prism 235, respectively.

The first light source 201 and second light source 213 are driven by drive circuits (not illustrated), and the LEDs emitting green light beams, the LEDs emitting red light beams, and the LEDs emitting blue light beams are lit up repeatedly in order. As a result, depending on the light beams outputted from an exit surface 224 of the composite rod integrator 231 single color lighting can be realized. It is also possible to output white light by driving all the LEDs, or to output light having colors other than green, red, and blue by individually adjusting output of the respective LEDs.

Figure 4:
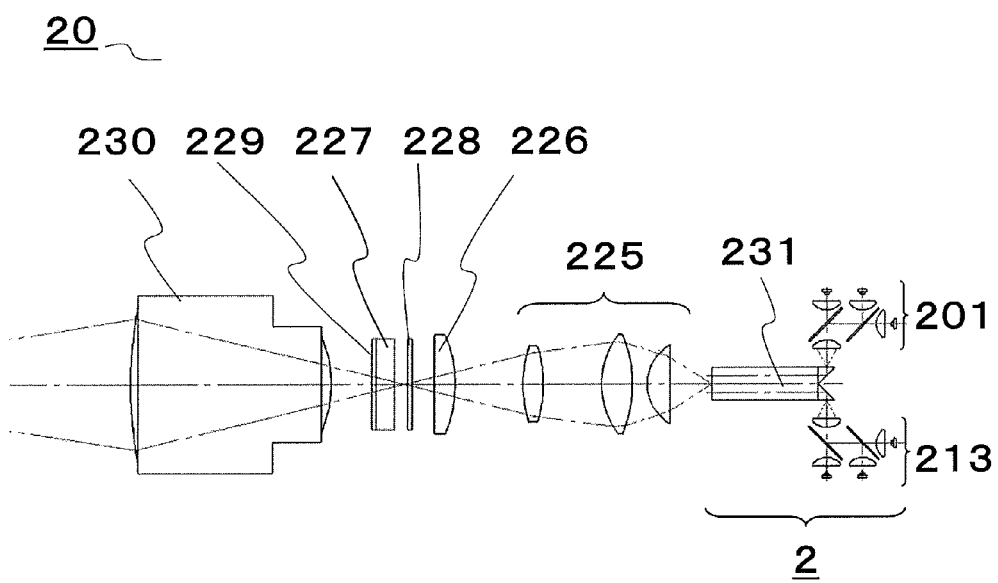
FIG. 4 is an enlarged view of a projection type display apparatus according to the second embodiment.

FIG. 4 is a configuration diagram of a projection type display apparatus according to the second embodiment.

A projection type display apparatus 20 includes the lighting device 2 illustrated in FIG. 3, a relay lens unit 225, a field lens 226, a liquid crystal panel 227, a light entering side polarizing plate 228, a light exiting side polarizing plate 229, and a projection lens 230.

Light beam outputted from the exit surface 224 of the composite rod integrator 231 is guided by the relay lens unit 225 and field lens 226, and enters the liquid crystal panel 227, which is an image display element. The liquid crystal panel 227 is sandwiched between the light entering side polarizing plate 228 and the light exiting side polarizing plate 229, and thereby retained in the projection type display apparatus. The liquid crystal panel 227 is composed of two-dimensionally arranged pixels, and each pixel is independently controlled by an external signal. Accordingly, the transmittance of the light beam passing through the light entering side polarizing plate, the liquid crystal panel, and the light exiting side polarizing plate is controlled by the external signal on a pixel-by-pixel basis. Light beam having passed through the light exiting side polarizing plate is projected as an image through the projection lens 230 onto a screen (not illustrated).

In the second embodiment, the liquid crystal panel is used as the image display element. However, a digital mirror device (DMD) which is a reflection type device, or a reflection type LCD device may be used.

Further, in the second embodiment, a sequential mirror type in which dichroic mirrors are arranged sequentially is adopted to align the central axis of the green light beam, blue light beam, and red light beam. However, a cross mirror type which is configured with intercrossed dichroic mirrors may be also adopted.

(Third Embodiment)

Figure 5:
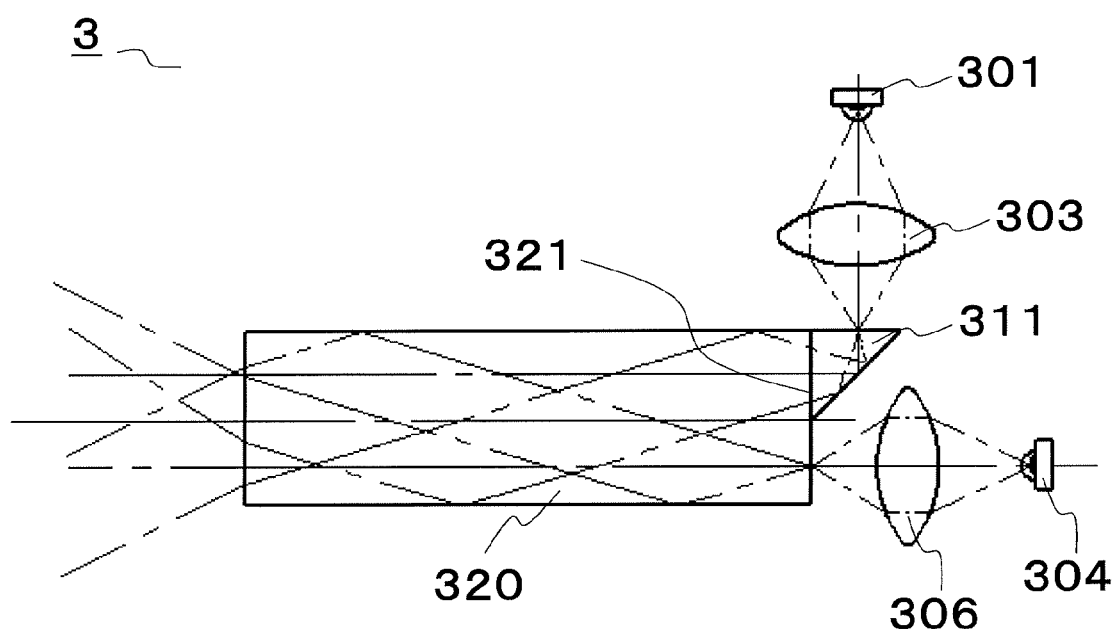
FIG. 5 is a configuration diagram of a lighting device according to a third embodiment.
Figure 6:
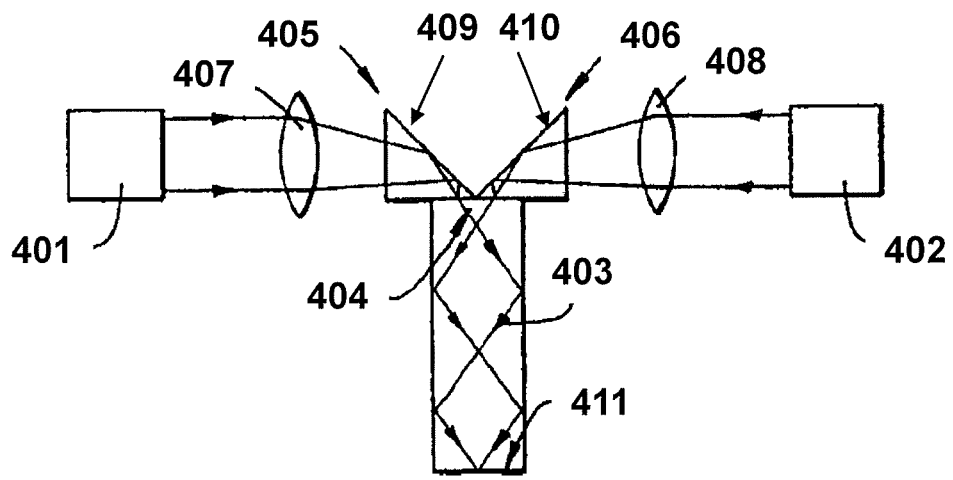
FIG. 6 is a configuration diagram of a lighting device used in a conventional projection type display apparatus.
Figure 7:
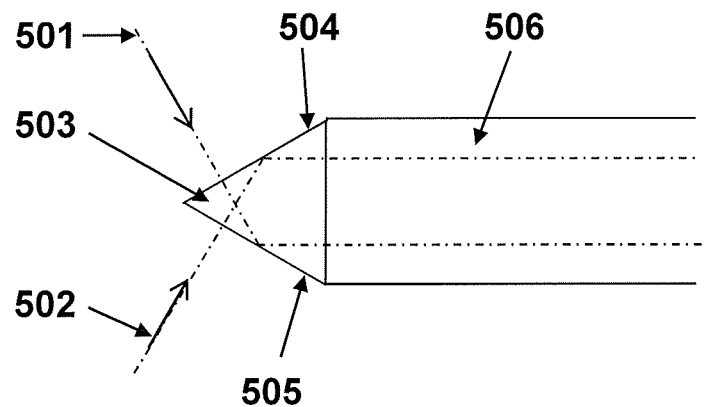
FIG. 7 is a configuration diagram of a lighting device used in a conventional projection type display apparatus.

FIG. 5 is a configuration diagram of a lighting device according to a third embodiment.

A lighting device 3 according to the third embodiment is different from that according to the first embodiment in that the lighting device 3 uses only one right-angle prism. More specifically, a light beam emitted from a second light source 304 directly enters through an incident surface 321 of a composite rod integrator 320, where a right-angle prism 311 is not provided.

As illustrated in FIG. 5, in lighting device 3 as well, interference between a first light source 301 and a second light source 304, or interference between an optical path of a light beam emitted from the first light source 301 and an optical path of a light beam emitted from the second light source 304 can be avoided.

In the lighting device 3 according to the third embodiment, a light beam emitted from the second light source 304 directly enters the composite rod integrator 320. As a result, as compared to the first embodiment, the number of the right-angle prisms can be reduced, and consequently, the manufacturing cost of the lighting device 3 can be reduced. Further advantageously, the light beam emitted from the second light source 304 enters the composite rod integrator 320 without being absorbed by the right-angle prism.

In the above-described first to third embodiments, two light sources are used. However, the number of the light sources is not particularly limited, as long as a plurality of light sources is used. For example, three or more light sources may be used in the first to third embodiments.

In the same manner as in the second embodiment, in the above-described first and third embodiments, a projection type display apparatus may be configured using the lighting devices according to the first and third embodiments.

The present invention is applicable to, for example, a lighting device using a plurality of light sources such as LEDs or the like, which have relatively low power consumption, and a projection type display apparatus using the lighting device.

While the invention has been described in detail, the foregoing description is in all aspects illustrative and not restrictive. It will be understood that numerous other modifications and variations can be devised without departing from the scope of the invention.

What is claimed is:

1. A lighting device comprising:
   a plurality of light sources;
   a plurality of converging lenses for converging respective light beams emitted from the light sources;
   a right-angle prism for bending the light beam emitted from one of the light sources; and
   a composite rod integrator for combining the light beams emitted from the plurality of light sources; wherein
   a predetermined air gap is provided between an exit surface of the right-angle prism and an incident surface of the composite rod integrator,
   the focal point of one of the plurality of converging lenses is located on an incident surface of the right-angle prism, and
   the lighting device is configured to satisfy the following condition:

$|n1 \sin(\pi/2 - 2\theta i + \sin^{-1}((\sin(\theta c))/n1))| < 1$, where
   $\theta i$: angle formed between a central axis of the light beam entering the right-angle prism and a line perpendicular to the inclined surface of the right-angle prism,
   $\theta c$: angle formed between the light beam that is outputted from the converging lens and incident on the incident surface of the right-angle prism at the largest incident angle, and the optical axis of the converging lens, and n1: refractive index of material forming the right-angle prism.

2. The lighting device according to claim 1, wherein the light beam emitted from the one of light sources enters through the incident surface of the right-angle prism perpendicularly.

3. The lighting device according to claim 1, wherein the right-angle prism is formed of highly refractive material having a refractive index of 1.5 or more.

4. The lighting device according to claim 1, wherein two surfaces of the right-angle prism, except the incident surface, the exit surface, and an inclined surface, are parallel to each other.

5. The lighting device according to claim 1, wherein an angle formed between the incident surface and the inclined surface of the right-angle prism is 45 degrees.

6. The lighting device according to claim 1, wherein:
   a plurality of the right-angle prisms are arranged with respect to the composite rod integrator, and
   the sum of the area of exit surfaces of the plurality of right-angle prisms is equal to the area of the incident surface of the composite rod integrator.

7. The lighting device according to claim 1, wherein the light beam entering the right-angle prism does not contain ultraviolet light and infrared light.

8. The lighting device according to claim 1, wherein each of the plurality of light sources is constituted of a solid-state light source.

9. A projection type display apparatus, comprising:
   the lighting device according to claim 1;
   an image display element, on which a light beam outputted from the lighting device is incident, for modulating the incident light beam in accordance with video signals; and
   a projection lens for projecting the light beam modulated by the image display element onto a screen.

* * * * *